(12) United States Patent
Wiberg et al.

(10) Patent No.: US 12,140,966 B2
(45) Date of Patent: Nov. 12, 2024

(54) METHOD FOR CONTROLLING A STRING OF VEHICLES

(71) Applicant: Volvo Truck Corporation, Gothenburg (SE)

(72) Inventors: Wilhelm Wiberg, Askim (SE); Stefan Bergquist, Gothenburg (SE); Antonio Amaral Craveiro, Gothenburg (SE); Edvin Valtersson, Sävedalen (SE)

(73) Assignee: Volvo Truck Corporation, Gothenburg (SE)

( * ) Notice: Subject to any disclaimer, the term of this patent is extended or adjusted under 35 U.S.C. 154(b) by 302 days.

(21) Appl. No.: 17/048,065

(22) PCT Filed: Apr. 12, 2019

(86) PCT No.: PCT/EP2019/059538
§ 371 (c)(1),
(2) Date: Oct. 15, 2020

(87) PCT Pub. No.: WO2019/201801
PCT Pub. Date: Oct. 24, 2019

(65) Prior Publication Data
US 2021/0294351 A1    Sep. 23, 2021

(30) Foreign Application Priority Data

Apr. 16, 2018    (WO) ................. PCT/EP2018/025119

(51) Int. Cl.
*G05D 1/00*    (2024.01)
*B60W 30/165*    (2020.01)
(Continued)

(52) U.S. Cl.
CPC ......... *G05D 1/0295* (2013.01); *B60W 30/165* (2013.01); *B60W 60/0015* (2020.02);
(Continued)

(58) Field of Classification Search
CPC ........ G05D 1/0295; G05D 2201/0213; B60W 60/0015; B60W 30/165;
(Continued)

(56) References Cited

U.S. PATENT DOCUMENTS 7,613,563 B2 * 11/2009 Haegebarth .............. G08G 1/22
701/422
2013/0041576 A1 * 2/2013 Switkes ............... G05D 1/0295
701/123
(Continued)

FOREIGN PATENT DOCUMENTS

CN    102445210 A    5/2012
CN    102901510 A    1/2013
(Continued)

OTHER PUBLICATIONS

International Search Report and Written Opinion for PCT/EP2018/025119, mailed Jan. 25, 2019, 10 pages.
(Continued)

*Primary Examiner* — Dale W Hilgendorf
*Assistant Examiner* — Frank T Glenn, III
(74) *Attorney, Agent, or Firm* — Withrow & Terranova, PLLC (57) ABSTRACT

The invention relates to a method for a string comprising a plurality of vehicles, including a lead vehicle and at least one follower vehicle, comprising the follower vehicle following, by means of vehicle-to-vehicle communication, the lead vehicle in a follower trajectory. The method comprises generating surroundings data, regarding the surroundings of at least a part of the string, generating, using the surroundings data, a backup trajectory, which is different from the follower trajectory, wherein the generated backup trajectory, or the surroundings data, is received by at least one of the at least one follower vehicle, wherein the receiving follower
(Continued)

vehicle follows the generated backup trajectory, upon a determination of a predetermined condition for following the generated backup trajectory.

24 Claims, 5 Drawing Sheets

(51) Int. Cl.
*B60W 60/00* (2020.01)
*G08G 1/00* (2006.01)

(52) U.S. Cl.
CPC ....... *G08G 1/22* (2013.01); *B60W 2554/4041* (2020.02); *B60W 2554/802* (2020.02); *B60W 2556/65* (2020.02)

(58) Field of Classification Search
CPC ..... B60W 2554/4041; B60W 2556/65; B60W 2554/802; G08G 1/22
See application file for complete search history.

(56) References Cited

U.S. PATENT DOCUMENTS

| | | | | |
|---|---|---|---|---|
| 2013/0060401 | A1* | 3/2013 | Hahne | B60W 30/0956 701/1 |
| 2016/0071418 | A1* | 3/2016 | Oshida | B60W 30/165 701/23 |
| 2017/0168489 | A1* | 6/2017 | Rander | G01C 21/26 |
| 2017/0192426 | A1* | 7/2017 | Rust | B60W 30/00 |
| 2017/0199523 | A1* | 7/2017 | Barton-Sweeney | B60W 30/0956 |
| 2017/0329348 | A1* | 11/2017 | Li | G05D 1/0293 |
| 2018/0074497 | A1* | 3/2018 | Tsuji | G05D 1/0257 |
| 2021/0107520 | A1* | 4/2021 | Oltmann | B60W 60/0015 |
| 2021/0232156 | A1* | 7/2021 | Del Castillo Igareda | G05D 1/0293 |

FOREIGN PATENT DOCUMENTS

| | | |
|---|---|---|
| CN | 107719363 A | 2/2018 |
| CN | 107719365 A | 2/2018 |
| DE | 10348635 A1 | 5/2005 |
| WO | 2017035516 A1 | 3/2017 |
| WO | 2018/039114 A1 | 3/2018 |

OTHER PUBLICATIONS

International Search Report and Written Opinion for PCT/EP2019/059538, mailed Jun. 7, 2019, 12 pages.
First Office Action for Chinese Patent Application No. 201980025853.1, mailed Oct. 27, 2023, 20 pages.
Third Office Action for Chinese Patent Application No. 201980025853.1, mailed Aug. 21, 2024, 20 pages.

* cited by examiner

METHOD FOR CONTROLLING A STRING OF VEHICLES

This application is a 35 USC 371 national phase filing of International Application No. PCT/EP2019/059538, filed Apr. 12, 2019, which claims the benefit of International Application No. PCT/EP2018/025119, filed Apr. 16, 2018, the disclosures of which are incorporated herein by reference in their entireties.

TECHNICAL FIELD

The invention relates to a method for controlling a string of vehicles comprising a lead vehicle and at least one follower vehicle, comprising the follower vehicle following, by means of vehicle-to-vehicle (V2V) communication, the lead vehicle in a follower trajectory. The invention also relates to a computer program, a computer readable medium, a control unit or a group of control units, and a vehicle.

The invention can be applied in heavy-duty vehicles, such as trucks and buses. Although the invention will be described with respect to trucks, the invention is not restricted to this particular vehicle, but may also be used in other vehicles such as cars.

BACKGROUND

V2V communication involves information sent between a vehicle, and one or more surrounding vehicles, over a wireless communication channel. In a string, in which a follower vehicle follows, by means of V2V communication, the lead vehicle in a follower trajectory, there may be a control of the longitudinal movements of the follower vehicle, as well as the lateral movements of the follower vehicle.

A follower vehicle following, by means of V2V communication, the lead vehicle in a string, may in some cases be referred to as autonomous vehicle following, auto-following, or driver-less platooning. Autonomous vehicle following allows the removal of the driver from the follower vehicles and have the vehicles follow the leader vehicle fully automatically. Thereby, in addition to longitudinal follower vehicle control, an automatic lateral follower vehicle control is used.

In addition to V2V communication, the follower vehicle could follow the lead vehicle by means of sensors included in the follower vehicle.

The lateral control of the follower vehicle could be provided by means of position coordinates received from the lead vehicle. The position coordinates may be sent by V2V communication. The lateral control of the follower vehicle could also be provided by means of the Global Navigation Satellite System (GNSS), e.g. using the Global Positioning System (GPS). In some cases, the lateral control may be provided by means of sensors included in the follower vehicle, e.g. by finding the rear-most part of the vehicle ahead and tracking it.

The longitudinal control of the follower vehicle could be provided by means of Cooperative Adaptive Cruise Control (CACC). Alternatively, the longitudinal control of the follower vehicle could be provided by means of Adaptive Cruise Control (ACC). More generally, a string does not necessarily have to involve CACC, but can involve some other technology for longitudinal control of the follower vehicle(s).

In platooning, e.g. by means of CACC, vehicle convoys are driven with short distances between the vehicles. Thereby the vehicles form what is herein referred to a string. The string may be formed of a row of vehicles, one following another. To achieve this with a high safety, a control unit of each vehicle may receive information from surrounding vehicles via V2V communication. For example, as suggested in WO2013006826, such shared information may include brake pressure, engine torque, engine RPM, accelerator pedal position, engine manifold pressure, vehicle speed, and radar/lidar data. Thus, it is understood that the V2V communication may provide for controlling the velocity and/or acceleration of a vehicle the string in dependence on the signals received from another vehicle in the string.

The information transferred by V2V communication may be used in the control to keep the desired distance between each vehicle and the immediately preceding vehicle and to handle events such as hard braking. For longitudinal control, the V2V communication enables keeping short distances safely since the V2V information is transferred much faster and is more accurate than data from on-board sensors included in the follower vehicle, such as radar sensors, laser sensors or cameras.

Benefits with platooning include increased fuel efficiency, provided by a reduced air-drag due to short distances between vehicles, and provided by improved vehicle control due to more accurate information about the preceding vehicle. A further benefit is an improved traffic flow due to the small delay, and usually almost instantaneous transmission, of the V2V data.

US2017329348 discloses selecting a first control mode for a follower vehicle in a vehicle platoon, if the vehicle is in a normal state. In the first control mode, the follower vehicle uses communication data received from the preceding vehicle in the platoon. A second control mode is selected if the follower vehicle is in an abnormal state. The follower vehicle comprises sensors, and in the second control mode, the follower vehicle uses data obtained by one or more of these sensors to control its movement. Thus, the document suggests, in the abnormal state, letting the follower vehicle's own sensors determine where to go. However, this can result in dangerous situations, due to the gap between vehicles being relatively short in V2V communication based platooning. Such a short distance may be difficult to handle without such communications.

Thus, there is still room for improvement of known platooning strategies. In particular, it is desired to increase the safety in connection with vehicle platooning. Also, it would be beneficial to decrease the complexity of vehicles in platooning, while increasing the safety in connection with vehicle platooning.

SUMMARY

An object of the invention is to decrease the complexity of vehicles in platooning. Another object of the invention is to increase the safety in connection with vehicle platooning.

The objects are reached with a method according to claim 1. Thus, the invention provides a method for controlling a string of vehicles comprising a lead vehicle and at least one follower vehicle, comprising the follower vehicle following, by means of vehicle-to-vehicle (V2V) communication, the lead vehicle in a follower trajectory, the method further comprising generating surroundings data, regarding the surroundings of at least a part of the string, and generating, using the surroundings data, a backup trajectory, which is different from the follower trajectory, wherein the generated backup trajectory, or the surroundings data, is received by at least one of the at least one follower vehicle, wherein the receiving follower vehicle follows the generated backup trajectory, upon a determination of a predetermined condition for following the generated backup trajectory.

Thus, the invention provides a method for a string comprising a plurality of vehicles, including a lead vehicle and at least one follower vehicle. Embodiments of the invention involve controlling the follower vehicle so as to follow the lead vehicle, in the follower trajectory. In embodiments of the invention, the lead vehicle is the foremost vehicle in the string. In embodiments of the invention, the at least one follower vehicle is behind the lead vehicle in the string. Where there is more than one follower vehicle, one follower vehicle may follow after the other, in a row. The vehicles may be platooning by means of vehicle-to-vehicle (V2V) communication. The V2V communication may be wireless. The string of vehicles may be formed by the vehicles platooning. The one or more follower vehicles may each connect to the lead vehicle via V2V communication. The follower vehicle might follow the lead vehicle by means of autonomous vehicle following.

In addition to the V2V communication, the follower vehicle may follow the lead vehicle in the follower trajectory with the assistance of other means. For example, the follower vehicle may follow the lead vehicle in the follower trajectory, by means of at least one or more sensors included in the follower vehicle, in addition to the V2V communication. For example, the V2V data can be used for speed control, and the sensor(s) can be used for lateral control, e.g. by finding the rear-most part of the vehicle ahead and tracking it. The follower trajectory may in some examples be generated as it is followed. In some embodiments, the follower trajectory may be provided by position coordinates received from the lead vehicle. The position coordinates may be sent by the V2V communication. Thus, data sent by the V2V communication may be used for lateral control of the follower vehicle(s). The follower trajectory may be generated, or determined, by an algorithm calculated based on position coordinates received from the lead vehicle.

Herein, longitudinal control is understood as control of longitudinal movements of a vehicle, and lateral control is understood as control of lateral movements of a vehicle. Longitudinal vehicle movements are herein understood as movements in an intended direction of straight travel of a vehicle. Lateral vehicle movements are herein understood as movements which are horizontal and perpendicular to longitudinal movements. Lateral vehicle movements are herein understood as sideways movements.

The backup trajectory may be generated while, and/or before, the follower trajectory is followed. Thus, the backup trajectory may be generated simultaneously with, and/or previously to, controlling the follower vehicle so as to follow the lead vehicle, in the follower trajectory. In some embodiments, the backup trajectory is partly generated before the follower trajectory is followed, e.g. based on map data, and partly while the follower trajectory is followed. It is conceivable that in some embodiments, the backup trajectory is generated before the follower trajectory is followed, e.g. purely based on map data.

The generated backup trajectory may be referred to as a planned trajectory. Generating the backup trajectory may be referred to as generating a planned trajectory. Generating the backup trajectory may mean planning the backup trajectory. The backup trajectory may be planned simultaneously with controlling the follower vehicle so as to follow the lead vehicle, in the follower trajectory. Generating the backup trajectory may mean determining, or calculating, the backup trajectory. As exemplified below, the backup trajectory may be generated in the form of a plurality of coordinates, and/or a polynomial. The backup trajectory may be generated by means of a control unit. As exemplified below, such a control unit may be a control unit of the lead vehicle, a control unit of the follower vehicle, or a control unit which is remotely located in relation to the vehicles.

The generated backup trajectory may be stored. The generated backup trajectory may be stored in a control unit, or a data storage accessible by a control unit. Such a control unit may be a control unit of the follower vehicle. The generated backup trajectory is preferably stored while the follower vehicle is controlled so as to follow the lead vehicle, in the follower trajectory. Thus, preferably the generated backup trajectory is stored in a control unit of the follower vehicle, or a data storage of the follower vehicle, accessible by a control unit of the follower vehicle, simultaneously with controlling the follower vehicle so as to follow the lead vehicle, in the follower trajectory. Thus, the receiving follower vehicle may comprise a control unit, and optionally a data storage accessible by the control unit. The control unit, or the data storage may comprise a memory. The method may comprise storing the generated backup trajectory in the memory.

It is understood that the backup trajectory is always generated before it is followed, if it is followed. The backup trajectory is preferably stored before being followed, if it is followed. As exemplified below, the backup trajectory might not be followed; instead it may be replaced by another backup trajectory, which in turn might not be followed as well. The determination of the predetermined condition for following the generated backup trajectory may be a necessary condition for following the backup trajectory.

The invention involves the generated backup trajectory, or the surroundings data, being received by at least one of the at least one follower vehicle. Embodiments of the invention comprise receiving, by means of at least one of the at least one follower vehicle, the generated backup trajectory, or the surroundings data. Preferably the generated backup trajectory, or the surroundings data, is received by means of V2V communication. The generated backup trajectory, or the surroundings data, may be received by means of a radio receiver of the receiving vehicle, and a data communication processing device of the receiving vehicle. The data communications processing device may communicate with a control unit of the receiving vehicle. It should be noted that the generated backup trajectory, or the surroundings data, is preferably received by the follower vehicle, from a source which is separate from the receiving follower vehicle. The surroundings data is preferably generated by a source which is different from any sensor of the receiving follower vehicle. The surroundings data may be generated by means of a control unit. The surroundings data, and, in some embodiments, the generated backup trajectory, is preferably generated outside, and remote from, the receiving follower vehicle. For example, where the surroundings data is received by the follower vehicle, and where the receiving follower vehicle comprises one or more sensors for controlling movements of the receiving follower vehicle, the surroundings data is preferably not received from the sensors of the receiving follower vehicle.

In embodiments of the invention, the surrounding data is created by some device not included in the follower vehicle(s). I.e. the surrounding data may be created outside of the follower vehicle(s). In embodiments of the invention, the backup trajectory is created by some device not included in the follower vehicle(s). Such a device may include a control unit. I.e. the backup trajectory may be created outside of the follower vehicle(s).

In embodiments of the invention, upon the determination of the predetermined condition, the follower vehicle is controlled so as to follow the generated backup trajectory. It is understood that executing the backup trajectory involves following the generated backup trajectory. Following the backup trajectory is herein also referred to as executing the backup trajectory. The determination of the predetermined condition may be an establishment of the existence of the predetermined condition. In embodiments of the invention, the follower vehicle will not be controlled so as to follow the generated backup trajectory, unless the predetermined condition is determined, i.e. unless the predetermined condition is determined to be present, i.e. the existence of the predetermined condition is established. It is understood that the step of generating the backup trajectory is different from the step of following the backup directory. The backup trajectory is preferably generated, even if the existence of the predetermined condition is not established. Also, where, as exemplified below, there are a plurality, or a series, of backup trajectories, they are preferably generated even if the existence of the predetermined condition is not established.

Preferably, the receiving follower vehicle, while following the backup trajectory, brakes to bring the receiving follower vehicle to a stop. Preferably, such braking is such that it brings the follower vehicle to a stop within a minimal amount of time.

As discussed further below, the surroundings data may be based on e.g. sensor data and/or map data.

By using the backup trajectory, i.e. by following the generated backup trajectory, a safe stop of the follower vehicle(s) may be performed. The backup trajectory gives a follower vehicle a plan, ready to use in case of an abnormal situation. This is an improvement over said known prior art solution, where, in an abnormal situation, the responsibility for avoiding a collision is handed over to the follower vehicle, which doesn't have any preplanned strategy for handling the situation. Thus, the invention increases safety in platooning. The invention also allows the follower vehicle(s) to comprise, i.e. be equipped with, no sensors, or less sensors, or less sophisticated sensor(s) than what would be needed for traditional automatic driving. This simplifies the hardware needed for platooning. The invention allows for reducing the complexity of vehicles participating in platooning. The invention saves equipment and costs needed for the platooning.

The predetermined condition may be, for example, a safety hazard. The invention providing for the receiving follower vehicle to follow the backup trajectory, upon a determination of the predetermined condition, allows for increased safety. Thus, the invention may increase the safety in connection with vehicle platooning.

In some embodiments, the predetermined condition is an operational parameter being below a predetermined safety threshold level. Thereby, the follower vehicle can follow backup trajectory to a safe state if the operational parameter is below the safety threshold level.

The predetermined condition could be that the communication with the lead vehicle is at least partially lost. The communication with the lead vehicle could be lost for a variety of reasons, for example traffic related reasons, or sensor related reasons, etc. Thus, the backup trajectory may be executed in case the communication with the lead vehicle is lost, e.g. so as to bring the follower vehicle to a safe stop. Circumstances which may affect the V2V communication may include one or more of the hardware, for V2V communication, provided in the vehicles, such as a V2V unit (ECU), antennas, cables, etc, how the V2V antennas are mounted in relation to each other on the vehicles, which may change dynamically due to the vehicles moving in relation to each other, and external disturbances, such as tunnels, other traffic, buildings, traffic signs, or weather. Further, where the vehicles include trailers, the trailers may have an impact on the V2V communication, for example where a trailer blocks a direct signal path during turning of the vehicle.

The predetermined condition may be a signal received by the receiving follower vehicle, representing a message that the follower trajectory should be abandoned. This may involve terminating the following of the follower trajectory. The signal may be received by means of a radio receiver of the receiving follower vehicle, and a data communication processing device of the receiving follower vehicle. The message could be that the backup trajectory should be executed, i.e. followed. The signal may be received from the lead vehicle. The signal may be sent by means of a data communication processing device of the lead vehicle, and a radio transmitter of the lead vehicle. The reason for the message could be, for example, that the lead vehicle is entering a critical situation where it is actually more dangerous to follow it than to execute the backup trajectory. For example, the message could be sent where the lead vehicle is about to crash. Another reason for the message could be that a fault has been found in the lead vehicle, that endangers the V2V communication in some way.

The predetermined condition may be that the inter-vehicle distance is outside of an interval to which it is compared. The predetermined condition may be that the inter-vehicle distance is larger than a threshold value to which it is compared. If the method is used for autonomous driving of the follower vehicle, and the follower vehicle does not have sensors needed for a fully, non-following, autonomous driving, and the inter-vehicle distance becomes too long, a hazard may occur when the follower vehicle no longer has the lead vehicle directly in front of it. The reason is that the increased distance may allow for changing circumstances between the passage at a road position of the lead vehicle to the passage at the same position of the follower vehicle. Such changing circumstances, such as the appearance of an obstacle, may not be detectable by the follower vehicle, if the latter is not equipped with one or more suitable sensors.

The predetermined condition may be an indication of a problem with the state of the health of the follower vehicle.

It should be noted that the method could involve a plurality of predetermined conditions for executing the backup trajectory, wherein the follower vehicle executes the backup trajectory upon a determination of one of the predetermined conditions.

Preferably, the method comprises generating a plurality of backup trajectories in a time sequence. Thereby, the backup trajectories could advantageously represent updated backup trajectories. The updated backup trajectories may be determined taking into account changes in the surroundings, as the string of vehicles, which may be platooning, move along. The backup trajectories may be generated within a predetermined time period following the generation of the respective preceding backup trajectory generation. The backup trajectories may be received by the follower vehicle within a predetermined time period following the reception by the follower vehicle of the respective preceding backup trajectory generation.

Preferably, the followed backup trajectory is the latest received backup trajectory. Thereby, it may be ensured that the executed backup trajectory is based on accurate, and updated surroundings data. Thereby, it is secured that there will always be, during the following in the follower trajectory, a safe stop available for the follower vehicle.

In some embodiments, the generated backup trajectories may be correlated with respective execution windows, each execution window providing a time limit after which the respective backup trajectory may, i.e. shall, not be followed. Thereby, the method is further adapted to ensure that the followed, i.e. executed backup trajectory is based on accurate, and updated surroundings data. In such embodiments, where the followed backup trajectory is the latest received backup trajectory, the predetermined condition may be that the time limit of the latest received backup trajectory has been reached. The follower vehicle may execute, if the time limit of the latest received backup trajectory is reached, the latest received backup trajectory. Thereby, a situation where the latest backup trajectory is of an age that creates a risk of it not being updated in view of changed surroundings, may be avoided. For example, if the follower vehicle does not receive an updated backup trajectory before the preceding backup trajectory becomes outdated, the follower vehicle may execute the latest backup trajectory and thereby transition to a safe state.

Where the string comprises a plurality of follower vehicles, a follower vehicle, behind the receiving follower vehicle, may follow, during the following of the backup trajectory, the receiving follower vehicle in a further follower trajectory. Thereby, the further follower vehicle is controlled so that the further follower vehicle follows the receiving follower vehicle in the further follower trajectory. The further follower trajectory may be generated before being followed. The further follower trajectory may be the backup trajectory received by the receiving follower vehicle, or generated by the receiving follower vehicle, where the latter receives the surroundings data. For example, any follower vehicle behind the receiving follower vehicle, executing the backup trajectory, may also drive along said backup trajectory. In some embodiments, the receiving follower vehicle may be arranged to be a leader for the rest of the followers. In such embodiments, a "normal" platooning functionality may bring all the further follower vehicles to a safe stop.

Preferably, the backup trajectory is generated by the lead vehicle. The backup trajectory may be generated by means of a control unit of the lead vehicle. E.g., where a plurality of backup trajectories are generated, as exemplified above, these generations may be done by the lead vehicle, whereupon the backup trajectories are transmitted to the following vehicle(s). In some examples, as the vehicles start driving, the lead vehicle may repetitively generate new backup trajectories, and send them to the follower vehicle(s).

In some embodiments, the surroundings data is at least partly generated by the lead vehicle. The surroundings data generated by the lead vehicle may represent signals from at least one sensor of the lead vehicle. Thereby, the lead vehicle may be equipped with one or more sensors to be used for generating the surroundings data, while the follower vehicle(s) may be equipped with no sensors, less sensors than the lead vehicle, or less sophisticated sensor(s) compared to that/those of the lead vehicle. By using the backup trajectory, a safe stop of the follower vehicle(s) may be performed even if the latter is/are equipped with no, less, or less sophisticated sensors compared to the lead vehicle. Thus, any extra sensors needed for generating a backup trajectory would only have to be provided on the lead vehicle, even when there are several follower vehicles. Thus, the need to include sensors in the following vehicle(s) is reduced or eliminated. This saves equipment and costs needed for the platooning. In addition, when following a vehicle closely, any sensor of the follower vehicle will be partially obstructed by the vehicle ahead, especially in the forward direction. The view in the forward direction is normally crucial. If, as in the prior art described above, the responsibility for the vehicle control is handed over to the follower vehicle in an abnormal situation, the follower vehicle may not have a sufficient view ahead for a safe handling. However, the lead vehicle will, compared to the follower vehicle(s), be better positioned for collecting the surroundings data. The lead vehicle will in many operational situations not have another vehicle closely in front of it. Therefore, for the lead vehicle compared to the follower vehicle(s), there will be less obstacles for sensor(s) to collect data on the surroundings. The lead vehicle could be said to have an easier task in generating the backup trajectory, since it has a better view of the surroundings.

The sensor(s) provided in the lead vehicle may depend on the kind of surroundings, e.g. as determined by the conditions and the environment, that the lead vehicle will drive in. In some embodiments, a plurality of different sensors may be needed. For example, a lidar sensor, a camera, or a radar, or any combination thereof, may be provided in the lead vehicle. Where a plurality of sensor types is provided, they may complement each other depending on changing conditions, such as rain, snow, strong sun, etc. A plurality of sensor types may in addition or alternatively be provided for redundancy in their evaluation of the surroundings, e.g. of objects and free space thereof.

The surroundings data may be at least partly map data. Thus, the surroundings data may comprise map data. In some embodiments, the surroundings data may be partly map data and partly based on, or representing, signals from at least one sensor of the lead vehicle. For example, besides on-board sensors of the lead vehicle, a database, e.g. with a high definition map, can be used to get improved information on options available for a safe stop at an execution of the backup trajectory. E.g., it might be better to exit on a motorway exit ramp and stop there, than to park on the motorway itself. In advantageous embodiments, the map data may be provided to the lead vehicle, whereby the sensor(s) may be used to identify objects, rather than to create an entire drivable area, within which the backup trajectory can be positioned. The database may be provided in the lead vehicle, or it may be at a remote location, whereby the map data is transmitted from the database to the lead vehicle. Nevertheless, in other embodiments, only one or more sensors of the lead vehicle are used to generate the backup trajectory.

In some embodiments, the receiving follower vehicle generates the backup trajectory by use of the surroundings data. Thereby, the backup trajectory may be generated by means of a control unit of the receiving vehicle. Thereby, the surroundings data may represent signals from at least one sensor of the lead vehicle. In addition, or alternatively, the surroundings data may be map data from the lead vehicle, or a database located remotely from the vehicles. Based on the received surroundings data the follower vehicle may generate the backup trajectory.

In some embodiments, the backup trajectory may be generated by a device which is not included in any of the vehicles in the string. Thus, the method may comprise generating the backup trajectory by means of a device which is not included in any of the vehicles in the string. This device may include a control unit. For example, the backup trajectory could be generated for a specific road. Such a generation may be done by a device which is remotely located in relation to the vehicles. In such embodiments, the backup trajectory may be sent directly from the remote device to the follower vehicle. Alternatively, or in addition, the backup trajectory may be sent from the remote device to the lead vehicle. Thereby, the lead vehicle may, e.g. by means of one or more sensors, verify that that there are no objects, e.g. movable objects, in the backup trajectory. In such embodiments, the lead vehicle may adapt the backup trajectory received from the remote device, in case an object therein is detected. Such an adaption may ensure that a collision with such an object is avoided.

In some embodiments, the method comprises determining at least one vehicle feature of at least one of the at least one follower vehicle, wherein the generated backup trajectory is at least partly based on the determined vehicle feature. Thereby, the backup trajectory can be adapted to the follower vehicle(s). Thus, the backup trajectory can be adapted to features of the follower vehicle, e.g. the weight, the length, etc., of the follower vehicle. Where the lead vehicle generates the backup trajectory, such follower vehicle features may be sent from the follower vehicle(s) to the lead vehicle via the V2V communication. Such an adaption of the backup trajectory makes it possible to ensure that the backup trajectory is feasible for the follower vehicle to execute. For example, a very heavy or long follower vehicle might need a slightly different trajectory, compared to that needed for a lighter or shorter follower vehicle.

In some embodiments, the generated backup trajectory is such that it guides the receiving follower vehicle out of a road lane in which the receiving follower vehicle is travelling. Thereby, receiving follower vehicle may be guided out of a lane in which the receiving follower vehicle is travelling in, i.e. following, the follower trajectory. Thereby, the follower vehicle may be moved out of the lane when stopping, so as to not cause an obstacle to other vehicles in the lane, e.g. vehicles not part of the string of vehicles, which may be platooning.

In some embodiments, the backup trajectory initially follows the lane, and takes after a certain length a fallback route, e.g. to a road shoulder or similar. This gives, in embodiments where a plurality of backup trajectories are generated in a time sequence, as exemplified above, the follower vehicle a relatively long time, while travelling along the backup trajectory, to determine that no new backup trajectory is available, before being forced to take action, e.g. in the form of leaving the lane and braking.

In some embodiments, the backup trajectory may be such that the follower vehicle stops in the lane in which the follower vehicle is travelling in, i.e. following, the follower trajectory. Thereby, a process which is simple to execute is provided.

The generated backup trajectory may be provided in the form of a plurality of coordinates, and/or a polynomial. The coordinates, or the polynomial, may be provided in a fixed coordinate system, e.g. a coordinate system fixed to a road on which the vehicles are travelling. The coordinates, or the polynomial, may be provided in a coordinate system, fixed or non-fixed, which is common to the lead vehicle and the follower vehicle. A polynomial could represent a free path for the follower vehicle to take. Any unambiguous representation of a line, or an area, may be used for the backup trajectory. Thereby, it is avoided that the follower vehicle may be presented with a choice of a plurality of paths, including a path that is not safe.

In some embodiments, the generated backup trajectory is at least partly based on a drivable area. In such embodiments, the backup trajectory may be a line which is determined based on a drivable area. The drivable area is preferable void of obstacles for the receiving follower vehicle. The drivable area may be based on a free space detection. The drivable area may form at least a portion of the surroundings data. The drivable area may be sent to the follower vehicle, whereupon the follower vehicle determines, based on the drivable area, the backup trajectory, providing a way to stop safely.

Where the string comprises a plurality of follower vehicles, and a follower vehicle, behind the receiving follower vehicle, follows, as described above, during the execution of the backup trajectory, the receiving follower vehicle in a further follower trajectory, the receiving follower vehicle can find a suitable backup trajectory within the drivable area, and the rest of the follower vehicles may in turn follow the receiving follower vehicle.

In some embodiments, the generated backup trajectory comprises speed data indicating a target speed of the receiving follower vehicle at at least one point along the generated backup trajectory. For example, the follower vehicle may brake, while following the backup trajectory, so as to stop. Thereby, the backup trajectory may include a plurality of coordinates, where each coordinate may have a target speed for the follower vehicle. Thus, the follower vehicle may brake to follow the target speed for the respective coordinate. Thereby a speed profile may be provided for the backup trajectory, e.g. by the lead vehicle. The lead vehicle may be in the best position to determine the strength of the braking needed in the backup trajectory. For example, it may be needed to reduce speed as soon as possible, i.e. to brake hard. Thereby, the follower vehicle may brake, while following the backup trajectory, for it to stop in the shortest amount of time possible. However, in some cases, there may be enough room allowed for the backup trajectory to make a smoother stop.

The surroundings data may, in some embodiments, be generated before the receiving follower vehicle follows the lead vehicle in the follower trajectory. Thereby, the receiving follower vehicle may receive the backup trajectory, or the surroundings data, before the receiving follower vehicle follows the lead vehicle in the follower trajectory. In some embodiments, the backup trajectory is generated before the receiving follower vehicle follows the lead vehicle in the follower trajectory. The surroundings data may, in some examples, be generated before the receiving follower vehicle joins the string, the receiving follower vehicle receiving the backup trajectory, or the surroundings data, before joining the string. The surroundings data may, in some examples, be generated before the string is formed. The surroundings data may be regarding the surroundings of the lead vehicle. Thus, the surroundings data may be regarding the surroundings of a part of the string to be formed. In some examples, the backup trajectory may be generated before any platooning with auto-following, starts. In some embodiments, the lead vehicle may be given a signal from one or more of the at least one follower vehicle, indicating that the respective follower vehicle has received a backup trajectory. Thereby the lead vehicle may be arranged to not start driving unless such a signal has been received. When the receiving follower vehicle follows the lead vehicle in the follower trajectory, the receiving follower vehicle may receive sequential updated backup trajectories, or sequential updated surroundings data.

The receiving follower vehicle may be driverless. In some embodiments, the at least one follower vehicle has no driver, and the lead vehicle is the only vehicle with a driver in it. Thereby, advantage may be taken of the backup trajectory, in order to simplify the platooning process. Removing a driver will save costs. Also, it may be easier to produce an automatic follower vehicle compared to a fully automatic vehicle. In the follower situation, the follower vehicle knows that the lead vehicle, which may be manually driven, have driven the same way only a short time in advance, and the follower vehicle therefore knows that the path is drivable and that there are no objects in the way. Therefore, it will be possible to realize an auto-follower vehicle with a much cheaper sensor platform compared to a fully automatic vehicle. Nevertheless, in some embodiments, also the lead vehicle is driver-less, and is fully automatic with suitable sensors.

The object is also reached with a computer program, a computer readable medium, a control unit or a group of control units, or a vehicle. In some embodiments, the method may be performed by a group of control units distributed in at least two of the vehicles in the string. In some embodiments, the method may be performed by a group of control units distributed in one or more vehicles of the string, and a control unit remote from the vehicles in the string.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
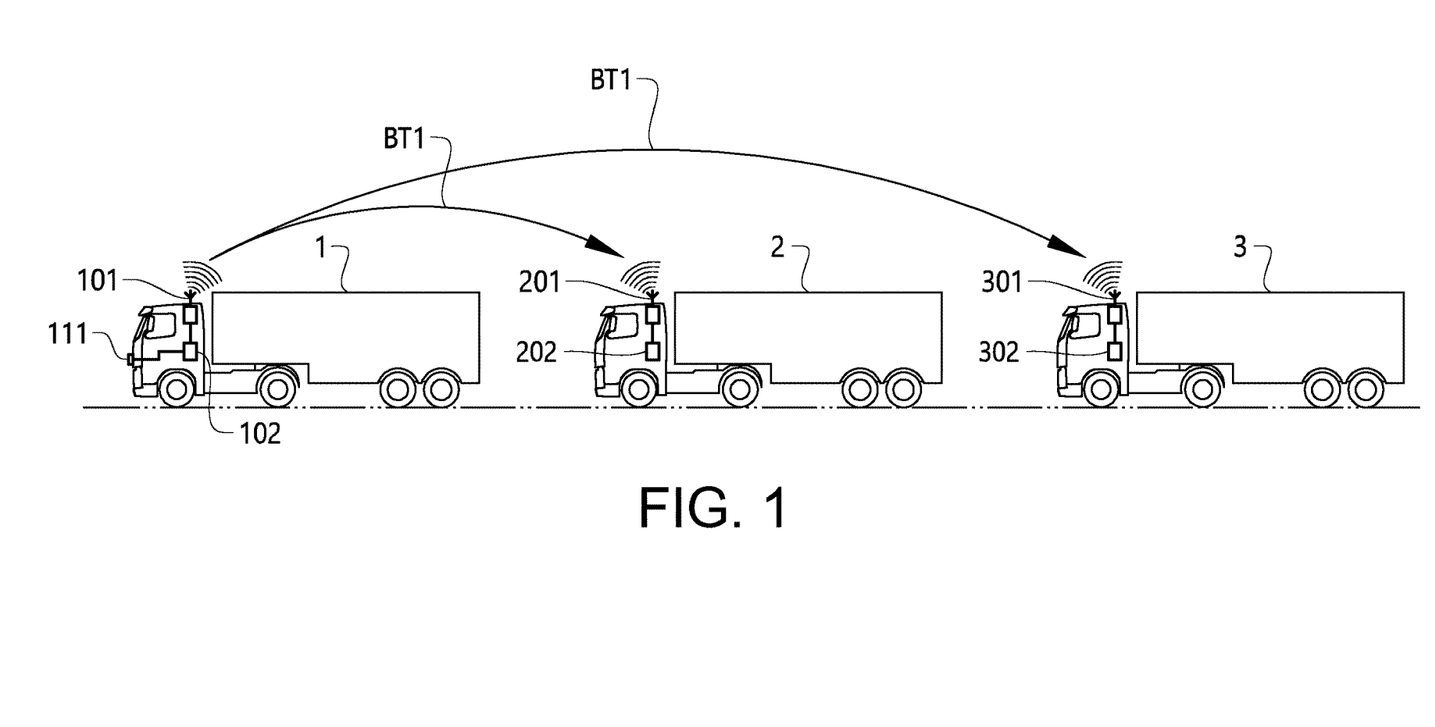
FIG. 1 is a side view of vehicles in a string of platooning vehicles.

FIG. 1 shows what is herein referred to as a lead vehicle 1, and follower vehicles 2, 3. In this example, the vehicles 1, 2, 3 are trucks with semitrailers. However, the invention is equally applicable to other types of vehicles, such as cars, buses and dump trucks.

Each of the vehicles 1, 2, 3 comprises equipment 101, 201, 301 for platooning. For longitudinal control, the vehicles comprise in this example equipment for Cooperative Adaptive Cruise Control (CACC). The platooning equipment includes means for wireless communication with a radio transmitter and a radio receiver for so called Vehicle-to-Vehicle (V2V) communication, and a data communication processing device which is arranged to communicate with a control unit 102, 202, 302 of a respective vehicle control system. The control units 102, 202, 302 are herein also referred to as a group of control units. The wireless communication could be based on any suitable industry standard format, such as WiFi, radio modem, or Zigbee. This wireless communication could alternatively be based on a non-industry-standard format. The means for wireless communication is in this example also used for lateral control of the follower vehicles 2, 3.

The lead vehicle 1 and the follower vehicles 2, 3 form parts of a string comprising a plurality of vehicles platooning, using autonomous vehicle following by means of the V2V communication. The lead vehicle is at the front of the string. In this example, a first 2 of the follower vehicles follows immediately behind the lead vehicle 1. In this example, only three vehicles are shown, but the string could comprise more than three vehicles, or only two vehicles.

In the string each vehicle transmits wireless signals representative of the velocity and the acceleration of the transmitting vehicle, and vehicle features including the weight and dimensions of the transmitting vehicle. The vehicle immediately behind the respective transmitting vehicle receives said wireless signals from the transmitting vehicle. Thereby, in this vehicle platooning process, each vehicle, except the lead vehicle 1, is a receiving vehicle controlled to be at a relatively short distance from a transmitting vehicle immediately in front of the respective receiving vehicle.

In addition, position coordinates of the lead vehicle 1 are repeatedly received by the follower vehicles 2, 3 from the lead vehicle, by the V2V communication. The position coordinates are used for lateral control of the follower vehicles. Thereby, the follower vehicles 2, 3 follow the lead vehicle 1 in what is herein referred to as a follower trajectory. The follower vehicles 2 may, or may not, be driverless.

The vehicle control system of the respective receiving vehicle controls brakes, a drivetrain, and a steering function of the receiving vehicle based on the wireless signals received from the respective transmitting vehicle.

It should be noted that in some embodiments, the vehicle control system of the respective receiving vehicle may control brakes, the drivetrain, and the steering function of the receiving vehicle based on the wireless signals received from a vehicle in front of the vehicle immediately in front of the respective receiving vehicle, e.g. from the lead vehicle at the front of the string, as an alternative to or in addition to wireless signals received from the vehicle immediately in front of the respective receiving vehicle. In some embodiments, all follower vehicles are at least partly controlled based on signals from the lead vehicle.

The lead vehicle 1 comprises a sensor in the form of a radar sensor 111. The lead vehicle control unit 102 is arranged to receive signals from the sensor 111. In alternative embodiments, the sensor could be a LIDAR sensor or a camera. In some embodiments, the lead vehicle is equipped with a combination of sensors, e.g. a radar sensor and a LIDAR sensor, a radar sensor and a camera, a LIDAR sensor and a camera, or a radar sensor, a LIDAR sensor and a camera.

The sensor 111 may also be used to detect obstacles in a region in front of the lead vehicle. This region includes part of a lane in which the lead vehicle is travelling. Said region also includes parts of areas outside of the lane in which the lead vehicle is travelling. The region in which obstacles can be detected by the sensor 111 includes a part of a shoulder of the road on which the vehicles are travelling. Said region includes a part of a lane which is adjacent to the lane in which the lead vehicle 1 is travelling. Such obstacles may be non-moving in relation to the road, or they may be moving. Also, by means of the sensor 111, the distance to, velocity of and acceleration of a vehicle in front of the lead vehicle may be determined. The sensor may be arranged to detect objects on the side of the vehicle string. This may be useful to detect vehicles moving faster than the vehicle string, and driving in the same direction, in another lane, or on a motorway on-ramp.

Figure 2:
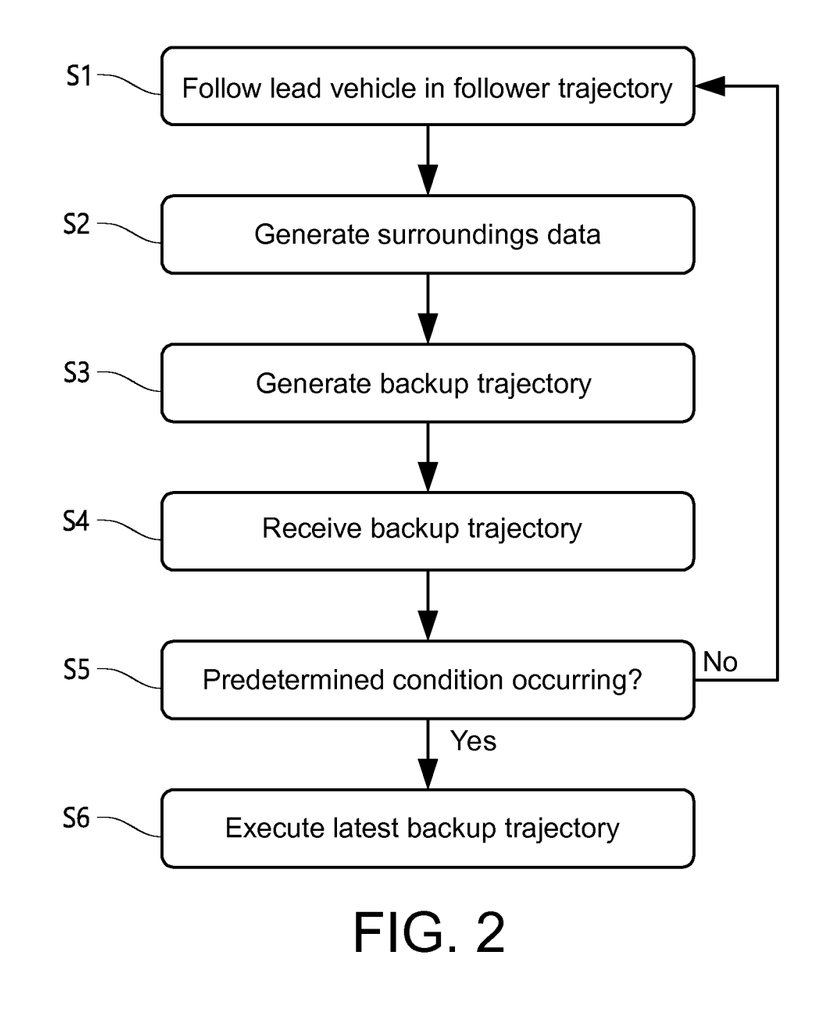
FIG. 2 is a diagram depicting steps in an embodiment of a method performed by the vehicles in FIG. 1.

With reference also to FIG. 2 an embodiment of a method according to the invention will be described. The lead vehicle 1 is moving along a lane of a road. The method comprises the follower vehicles 2, 3 following S1 the lead vehicle 1 in the follower trajectory. Thereby, all vehicles in the string are in the same lane.

While moving, the lead vehicle 1 generates S2, by means of the sensor 111, surroundings data, regarding the surroundings, in this example the region in front of the lead vehicle 1. Thus, the surroundings data represents signals from the sensor 111.

Additional surroundings data may be optionally provided to the lead vehicle in the form of map data. This may be done by a detailed map of the road being transmitted to the lead vehicle from a data handling device, which is located remote from the vehicles. The map could include, for example, information on the size of the road shoulder, on locations and appearances of motorway exit and entry raps, and permanent obstacles close to the road, etc. The position of the lead vehicle could be interposed to the map data, e.g. by means of the Global Positioning System (GPS). The map for a relatively long stretch of road ahead could be transmitted in a bulk data transmission to the lead vehicle 1. The map for a relatively long stretch of road ahead could be stored in a storage unit of the lead vehicle. Alternatively, the map data could be transmitted as required, as the lead vehicle moves along the road.

It should be noted that the type of surroundings data may change depending on the circumstances. For example, some surroundings data may be transmitted from a remote, stationary source, but such surroundings data may not be received due to circumstances, e.g. if the vehicles are driving in a tunnel. Thereby the surroundings data may be based only on sensor signals.

Figure 3:
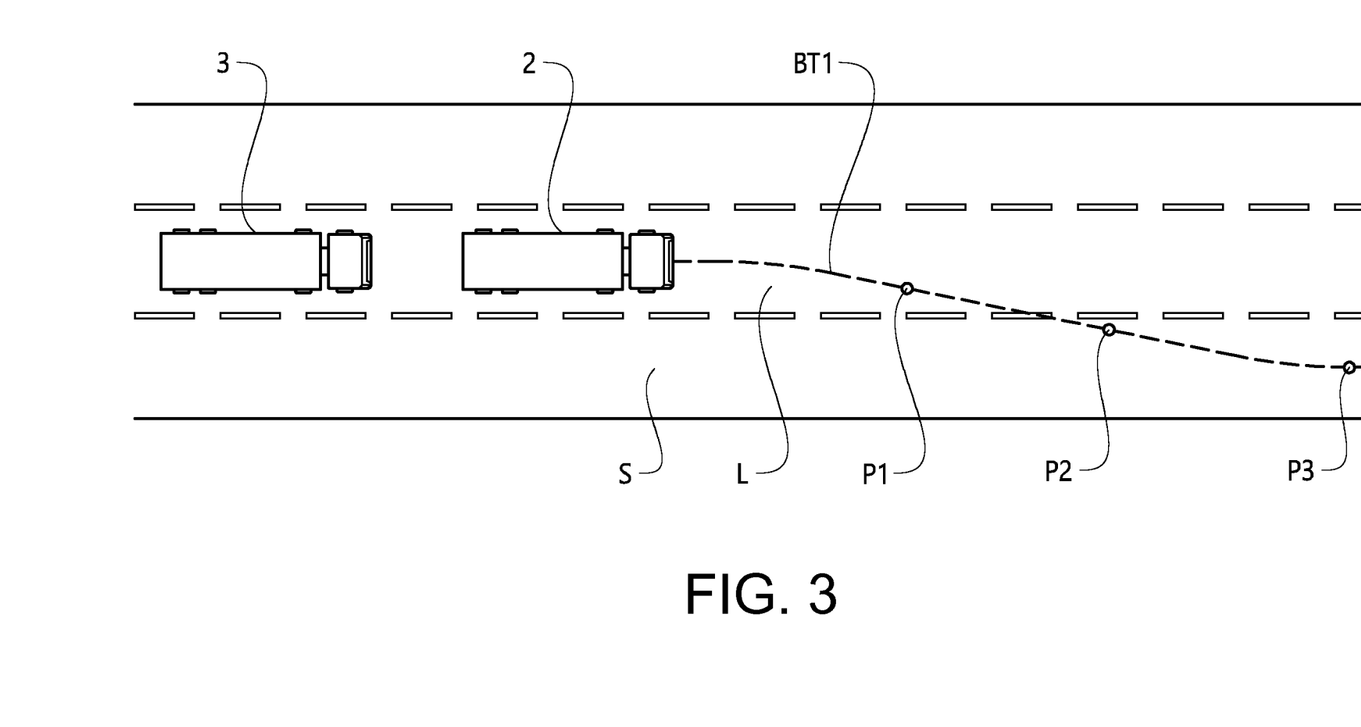
FIG. 3 is a top view of two of the vehicles in FIG. 1, and a portion of a road on which they are travelling.

Reference is made also to FIG. 3. Using the surroundings data, the lead vehicle repetitively generates S3 backup trajectories BT1 for the follower vehicles 2, 3, which are different from the follower trajectory. The backup trajectories are generated separated by predetermined time intervals. Upon generating each backup trajectory, BT1, the respective backup trajectory is sent to the follower vehicles 2, 3. Thus, the follower vehicles 2, 3 repetitively receives S4 a new backup trajectory from the lead vehicle 1.

As they are received, the backup trajectories are stored in a respective memory of the respective control unit 202, 302 of the respective follower vehicle control system.

The follower vehicles 2, 3 will not follow a backup trajectory, unless a predetermined condition S5 is determined, i.e. established to exist. The predetermined condition could be any of a plurality of conditions, including lost V2V communication with the lead vehicle 1, an operational parameter, e.g. of a follower vehicle 2, 3, being below a predetermined safety threshold level, and a signal sent by the lead vehicle, representing a message that the follower trajectory should be abandoned.

If such a predetermined condition is determined S5 by the follower vehicles 2, 3, the follower vehicles execute S6, i.e. follow, the latest received backup trajectory BT1. As can be seen in FIG. 3, the backup trajectory BT1 in this example is such that it guides the follower vehicles 2, 3 out of the lane L in which they are travelling, and onto a shoulder S of the road. Thus, the follower vehicles are steered out of the lane L. Also, while following the backup trajectory, the follower vehicles are braked to a stop.

The backup trajectory BT1 is provided in the form of a series of coordinates from which a polynomial is formed. For the braking of the follower vehicles 2, 3, the backup trajectory BT1 comprises speed data indicating a target speed of the follower vehicles 2, 3 at a plurality of points P1, P2, P3 along the backup trajectory BT1.

In this example, a second 3 of the follower vehicles, following the first follower vehicle 2, follows, during the execution of the backup trajectory BT1, the first follower vehicle 2 in a further follower trajectory. Thus, as the first follower vehicle 2 follows the backup trajectory, the second follower vehicle 3 receives, in a traditional CACC fashion, V2V signals representative of the velocity and the acceleration of the first follower vehicle 2, and control in dependence thereof its velocity and acceleration, so as to follow the first follower vehicle in a further follower trajectory. Alternatively, the second follower vehicle 3 may execute, i.e. follow, the backup trajectory BT1 independently of the first follower vehicle 2.

It should be noted that in this example, the lead vehicle receives, via the V2V communication, from a transmitting vehicle, before the later vehicle joins the string, vehicle features including the weight and dimensions of the transmitting vehicle. Thereby, the sequentially generated backup trajectories BT1 are partly based on the vehicle features of the transmitting vehicle. However, in alternative embodiments, generated backup trajectories BT1 are not based on vehicle features of follower vehicles.

It should also be noted that in this example, a vehicle seeking to join the string, will not join the string, until it has received a backup trajectory.

It should also be noted that in some embodiments, the sequentially generated and received backup trajectories are correlated with respective execution windows. Each execution window provides a time limit after which the respective backup trajectory BT1 may not be executed. In such embodiments, a predetermined condition, leading to the execution of a backup trajectory, may be that the time limit of the latest received backup trajectory BT1 has been reached.

Figure 4:
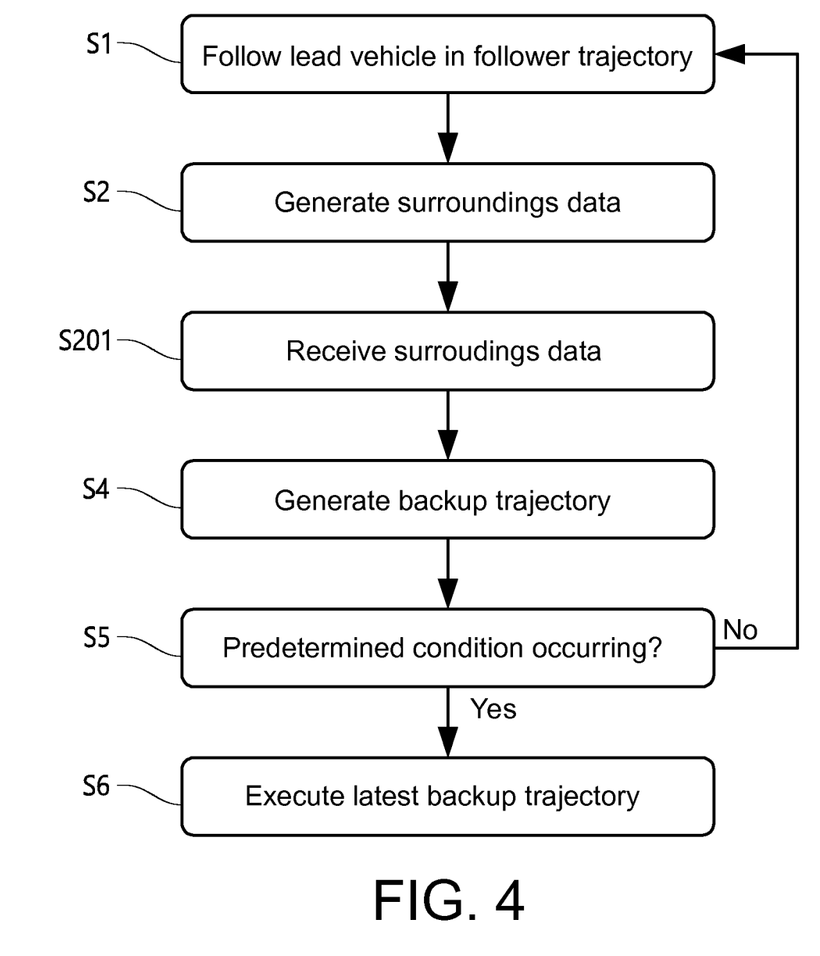
FIG. 4 is a diagram depicting steps in a method according to an alternative embodiment of the invention.

Reference is made to FIG. 4, depicting steps in a method according to an alternative embodiment of the invention. The method in FIG. 4 is similar to the one described with reference to FIG. 2, except for the following differences:

Instead of the follower vehicles 2, 3 receiving the backup trajectories, the follower vehicles receive S201 from the lead vehicle 1 surroundings data, generated by the lead vehicle 1. This surroundings data is updated continuously or repetitively. Therefore, surroundings data is received repetitively by the follower vehicles 2, 3. Based on the received surrounding data, the follower vehicles repetitively generate a backup trajectory.

Figure 5:
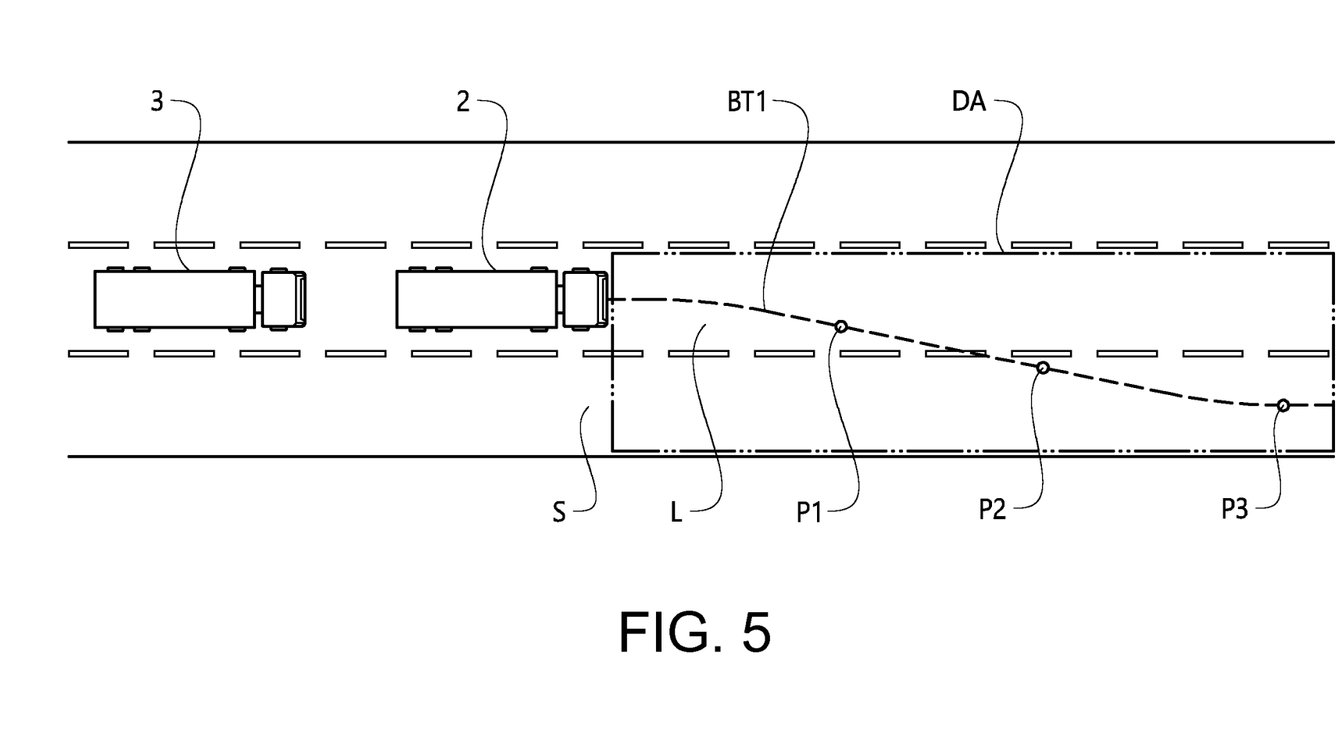
FIG. 5 is a top view of two vehicles participating in the method in FIG. 4, and a portion of a road on which they are travelling.

Reference is also made to FIG. 5. In the embodiment in FIG. 4, the surrounding data comprises data describing a drivable area DA. This is an area in front of the follower vehicles 2, 3, which is, as determined by means of the lead vehicle sensor 111 (FIG. 1) and map data, determined to be free from of obstacles and suitable to drive in. The drivable area DA is updated continuously or repetitively. The drivable area DA may be generated by the lead vehicle 1, or by the follower vehicles 2, 3 based on surroundings data received by the lead vehicle 1.

During the repetitive generation of backup trajectories, the follower vehicles 2, 3 generate each new backup trajectory BT1 based on the latest drivable area DA. Thereby, the follower vehicles 2, 3 generate a suitable backup trajectory which is completely within the boundaries of the drivable area.

It is to be understood that the present invention is not limited to the embodiments described above and illustrated in the drawings; rather, the skilled person will recognize that many changes and modifications may be made within the scope of the appended claims.

The invention claimed is:

1. A method for controlling a string of vehicles comprising a lead vehicle and at least one follower vehicle following the lead vehicle in a follower trajectory by vehicle-to-vehicle communication, the method comprising:
generating, by at least one of a control unit in the lead vehicle and a control unit outside the lead vehicle, surroundings data, regarding the surroundings of at least a part of the string of vehicles; and
generating, by the control unit in the lead vehicle, using the surroundings data, a backup trajectory, which is different from the follower trajectory;
receiving, by at least one of the at least one follower vehicle, the generated backup trajectory; and
following, by the receiving follower vehicle, the generated backup trajectory, upon a determination of a predetermined condition that communications with the lead vehicle is lost;
wherein the backup trajectory is generated before the determination of the predetermined condition that communications with the lead vehicle is lost.

2. The method of claim 1, wherein the backup trajectory is generated at least one of while or before the follower trajectory is followed.

3. The method of claim 1, wherein the generated backup trajectory is a planned trajectory.

4. The method of claim 1, the method further comprising storing, by a control unit in the receiving follower vehicle, the generated backup trajectory.

5. The method of claim 1, wherein the predetermined condition is an operational parameter below a predetermined safety threshold level.

6. The method of claim 1, wherein the predetermined condition is a signal received by the receiving follower vehicle representing a message that the follower trajectory should be abandoned.

7. The method of claim 6, wherein the signal is received from the lead vehicle.

8. The method of claim 1, the method further comprising generating, by the control unit in the lead vehicle, a plurality of backup trajectories in a time sequence.

9. The method of claim 8, wherein the followed backup trajectory is a latest received backup trajectory.

10. The method of claim 8, wherein the generated backup trajectories are correlated with respective execution windows, each execution window providing a time limit after which a respective backup trajectory may not be followed.

11. The method of claim 10, wherein the followed backup trajectory is a latest received backup trajectory, and the predetermined condition is the time limit of the latest received backup trajectory having been reached.

12. The method of claim 1, wherein the string comprises a plurality of follower vehicles, wherein a follower vehicle, behind the receiving follower vehicle, follows, during the following of the backup trajectory, the receiving follower vehicle in a further follower trajectory.

13. The method of claim 1, wherein the surroundings data is at least partly generated by the lead vehicle.

14. The method of claim 13, wherein the surroundings data generated by the lead vehicle represents signals from at least one sensor of the lead vehicle.

15. The method of claim 1, wherein the surroundings data is at least partly map data.

16. The method of claim 1, wherein the receiving follower vehicle generates the backup trajectory by use of the surroundings data.

17. The method of claim 1, wherein the control unit outside the lead vehicle generating the surroundings data is remote from the vehicles in the string.

18. The method of claim 1, the method further comprising determining, by the control unit in the lead vehicle, at least one vehicle feature of at least one of the at least one follower vehicle, wherein the generated backup trajectory is partly based on the determined vehicle feature.

19. The method of claim 1, wherein the generated backup trajectory is such that it guides the receiving follower vehicle out of a lane in which the receiving follower vehicle is travelling.

20. The method of claim 1, wherein the generated backup trajectory is provided in the form of a plurality of coordinates and/or a polynomial.

21. The method of claim 1, wherein the backup trajectory is generated at least partly based on a drivable area.

22. The method of claim 1, wherein the generated backup trajectory comprises speed data indicating a target speed of the receiving follower vehicle for at least one point along the generated backup trajectory.

23. The method of claim 1, wherein:
the surroundings data is generated before the receiving follower vehicle follows the lead vehicle in the follower trajectory, and
the receiving follower vehicle receives the generated backup trajectory or the surroundings data before the receiving follower vehicle follows the lead vehicle in the follower trajectory.

24. The method of claim 1, wherein the receiving follower vehicle is driverless.

* * * * *